(12) United States Patent
Sherman et al.

(10) Patent No.: US 10,740,734 B2
(45) Date of Patent: Aug. 11, 2020

(54) INCENTIVIZED CROWD FUNDING SYSTEM FOR INTERNAL INNOVATION BY AN ORGANIZATION

(71) Applicant: 3M INNOVATIVE PROPERTIES COMPANY, St. Paul, MN (US)

(72) Inventors: Audrey A. Sherman, Woodbury, MN (US); Robert R. Kieschke, Woodbury, MN (US); Frank J. Sherman, Woodbury, MN (US); Mario A. Perez, Burnsville, MN (US); Raymond P. Johnston, Lake Elmo, MN (US); Kandyce M. Bohannon, Cedar Park, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 325 days.

(21) Appl. No.: 14/713,151

(22) Filed: May 15, 2015

(65) Prior Publication Data
US 2016/0335610 A1    Nov. 17, 2016

(51) Int. Cl.
G06Q 40/00        (2012.01)
G06Q 20/10        (2012.01)
(Continued)

(52) U.S. Cl.
CPC ............. *G06Q 20/10* (2013.01); *G06Q 20/22* (2013.01); *G06Q 50/01* (2013.01); *G06Q 50/184* (2013.01)

(58) Field of Classification Search
CPC ........ G06Q 40/06; G06Q 20/10; G06Q 50/01; G06Q 50/184; G06Q 20/22
(Continued)

(56) References Cited

U.S. PATENT DOCUMENTS 7,809,641 B2 * 10/2010 Sanders ................. G06Q 20/10
                                                              705/14.17
8,170,922 B2 *  5/2012 Cavagnaro ............. G06Q 20/12
                                                              705/26.1
(Continued)

FOREIGN PATENT DOCUMENTS

CN          1753013         3/2006
CN        201876941 U       6/2011
(Continued)

OTHER PUBLICATIONS

Anand: "Is Crowdfunding Bad for Investors?", Canadian Business Law Journal, 55(2), 215-230 (Year: 2014).*

*Primary Examiner* — Edward J Baird

(57) ABSTRACT

Crowd funding for innovation includes distributing a proposal with a description of a project idea, an amount of funds requested, and a time frame for raising the funds. Ownership of the project is transferred to an entity, which receives contributions from contributors and for each of the received contributions converts the contribution to a corresponding amount of virtual coin and adds the contribution to the funds. If the funding goal is complete within the time frame, the entity converts the coins to actual money and releases the money to the requestor. After completion of the project, the entity determines if the project is successful and can commercialize successful projects. For certain successful projects, the entity can also distribute the back funds to the contributors.

17 Claims, 4 Drawing Sheets

(51) Int. Cl.
*G06Q 50/00* (2012.01)
*G06Q 50/18* (2012.01)
*G06Q 20/22* (2012.01)

(58) Field of Classification Search
USPC .................................................. 705/35–40
See application file for complete search history.

(56) References Cited

U.S. PATENT DOCUMENTS

| | | | |
|---|---|---|---|
| 8,321,321 B2 | 11/2012 | Jagarlapudi | |
| 8,548,821 B2 | 10/2013 | Sheperd | |
| 8,706,809 B2 | 4/2014 | D'Amore | |
| 8,725,653 B1 | 5/2014 | Hernandez | |
| 8,756,151 B1 * | 6/2014 | Lubling | G06Q 40/02 705/38 |
| 9,026,922 B2 | 5/2015 | Dhaliwal | |
| 2006/0124729 A1 | 6/2006 | Martin | |
| 2009/0281941 A1 | 11/2009 | Worth | |
| 2010/0114685 A1 | 5/2010 | Blass | |
| 2012/0130853 A1 * | 5/2012 | Petri | G06Q 30/0609 705/26.35 |
| 2012/0130921 A1 * | 5/2012 | Williams | G06Q 40/06 705/36 R |
| 2012/0254013 A1 * | 10/2012 | Chee | G06Q 40/04 705/37 |
| 2012/0310755 A1 * | 12/2012 | Sheperd | G06Q 30/0214 705/14.73 |
| 2013/0144707 A1 | 6/2013 | Isaacson | |
| 2013/0185228 A1 | 7/2013 | Dresner | |
| 2013/0226688 A1 | 8/2013 | Harvilicz | |
| 2013/0318005 A1 * | 11/2013 | Bass | G06Q 30/02 705/36 R |
| 2014/0025473 A1 * | 1/2014 | Cohen | G06Q 30/0207 705/14.28 |
| 2014/0040157 A1 * | 2/2014 | Cohen | G06Q 40/06 705/329 |
| 2014/0046818 A1 | 2/2014 | Chung | |
| 2014/0058804 A1 | 2/2014 | Zhou | |
| 2014/0164049 A1 | 6/2014 | Yakos | |
| 2014/0164291 A1 | 6/2014 | Cameron | |
| 2014/0229397 A1 | 8/2014 | Fink | |
| 2014/0236750 A1 | 8/2014 | Zhou | |
| 2014/0279645 A1 | 9/2014 | Cohen | |
| 2014/0351116 A1 | 11/2014 | Hoff | |
| 2015/0017611 A1 * | 1/2015 | Moumneh | G09B 5/00 434/107 |
| 2015/0032652 A1 | 1/2015 | Brandes | |
| 2015/0039534 A1 | 2/2015 | Erissson | |
| 2015/0046239 A1 | 2/2015 | Di Franco | |
| 2015/0170112 A1 | 6/2015 | DeCastro | |
| 2015/0170286 A1 * | 6/2015 | Gingell | G06Q 40/06 705/36 R |
| 2016/0055455 A1 * | 2/2016 | Hill | G06Q 10/101 705/69 |
| 2016/0225100 A1 * | 8/2016 | Parrila | G06Q 40/12 |

FOREIGN PATENT DOCUMENTS

| | | | |
|---|---|---|---|
| CN | 103577935 | | 2/2014 |
| JP | 2002342569 A | * | 11/2002 |

* cited by examiner

INCENTIVIZED CROWD FUNDING SYSTEM FOR INTERNAL INNOVATION BY AN ORGANIZATION

BACKGROUND

Crowd funding is a way to fund a project by raising many small amounts of money from a large group of people. An example is the Kickstarter innovation web site from Kickstarter, Inc. (based in Greenpoint, Brooklyn, US). The Kickstarter site can be used to fund creative projects via crowd funding with Kickstarter retaining a portion of the funds as its fee. The creator of the project retains complete ownership of it. The backers are often helping to fund their friends' project and can see the creative process as it happens. Also, the backers may receive a copy of the finished creative work such as a book or CD. Since the project creator retains ownership of the project, this type of funding may not be desirable for a corporate funding of projects or ideas where the corporation wants to retain ownership of the project in order to commercialize it if the project is successful.

SUMMARY

A computer-implemented method of crowd funding for innovation, consistent with the present invention, includes distributing a proposal with a description of a project idea, an amount of funds requested, and a time frame for raising the funds. Ownership of the project is transferred to an entity. In response to the proposal, the entity receives contributions from contributors and for each of the received contributions the entity converts the contribution to a corresponding amount of coin, and adds the contribution to the funds. The entity releases an amount of money corresponding with the amount of coin in the funds if the funding goal is met within the time frame. The entity determines if the project is successful after the money is released. If the project is successful, the entity can optionally distribute the funds or a bonus to the contributors, converted from the coin.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of this invention include the combination of a crowd sourced idea generation electronic web site with crowd sourced funding for corporate innovation. The actual funding comes from internal corporate sources based upon contributions from individuals, since the ideas and projects that will be created and funded and ultimately produced will be the sole property of the company that employs the crowd. But the decision as to what to fund will be entirely up to the individuals (internal crowd) that are placing the funds on the projects and ideas as they see fit. The ideas are crowd sourced as well. This combination provides a new way for corporate innovation and commercialization of ideas, for example.

Figure 1:
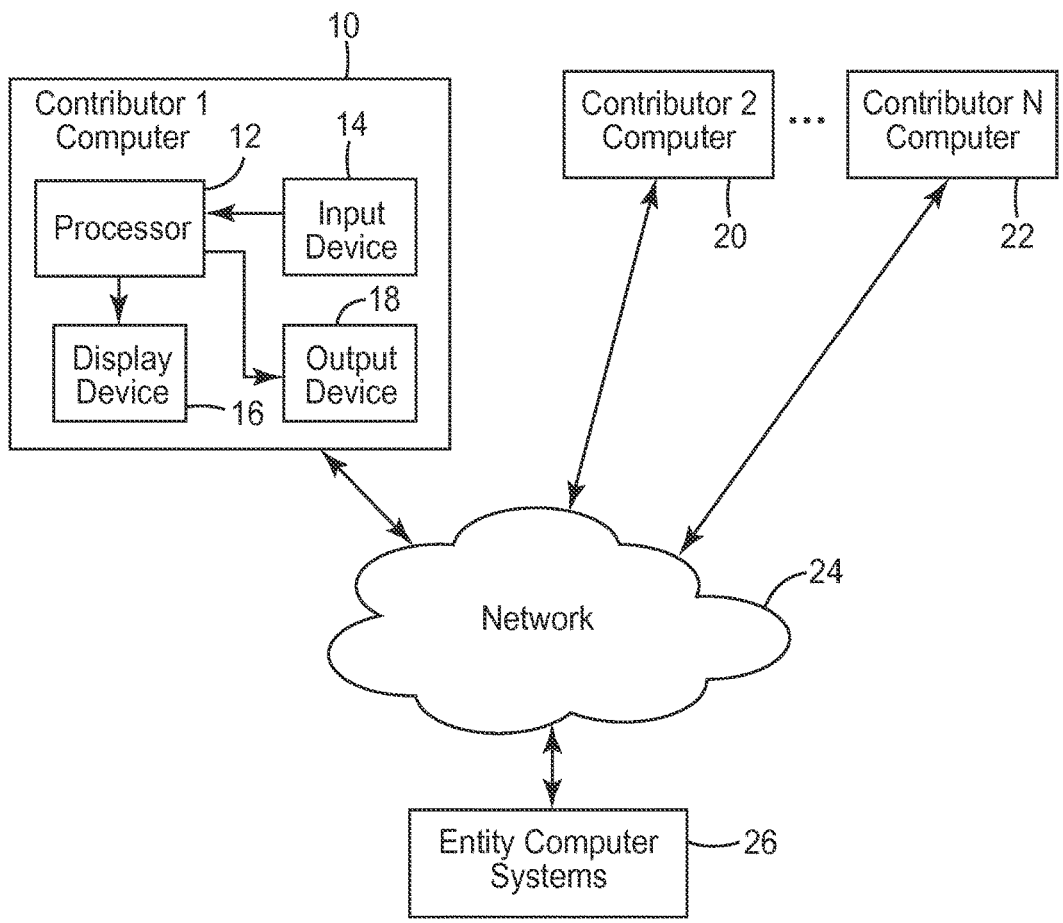
FIG. 1 is a diagram of a system for incentivized crowd funding.

FIG. 1 is a diagram of a system for incentivized crowd funding. The system includes contributor computers 10, 20, and 22 for use in contributing to a project. Contributor computer 10 can include a processor 12, an input device 14 for receiving information or commands, an electronic display device 16 for displaying information, and an output device 18 for outputting information in other forms such as audible information. Contributor computers 20 and 22 can include the same components, or be configured in the same way, as contributor computer 10. The contributor computers are electronically coupled to a network 24 such as the Internet or a corporate intranet. Entity computer systems 26 are also electronically coupled with network 24. Entity computer systems 26 can include computer applications used within large or small organizations, and such systems can include electronic mail (email), accounting systems, record keeping systems, electronic databases, and computers for hosting internal web sites. Only three contributor computers are shown for illustrative purposes, and the system can be scaled to include a large number of contributor computers, sufficient to fund a project, coupled to entity computer systems 26 via network 24. The entity can be, for example, a corporation, partnership, or other organization involved in developing ideas for innovation. The entity controls, directly or indirectly, entity computer systems 26.

Figure 2:
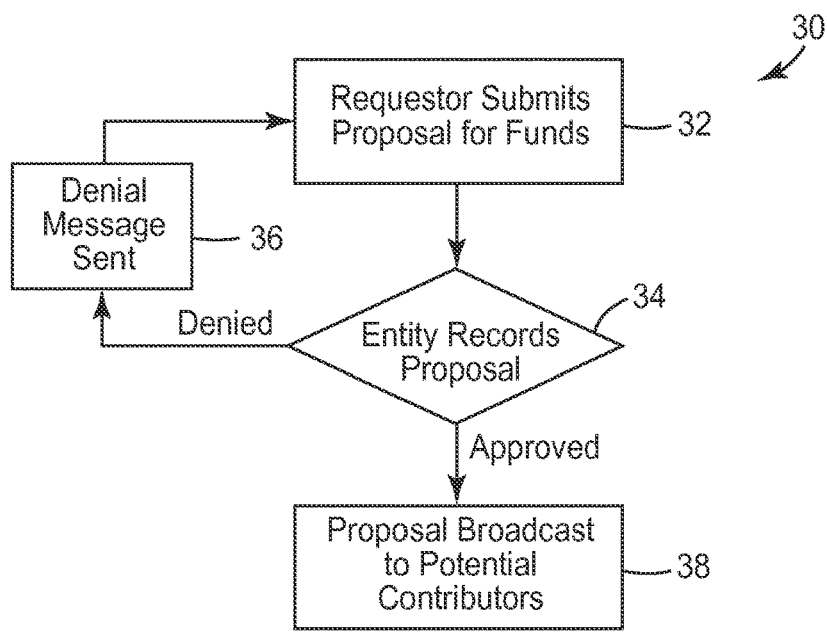
FIG. 2 is a flow chart of a method for receiving a proposal for crowd funding.
Figure 4:
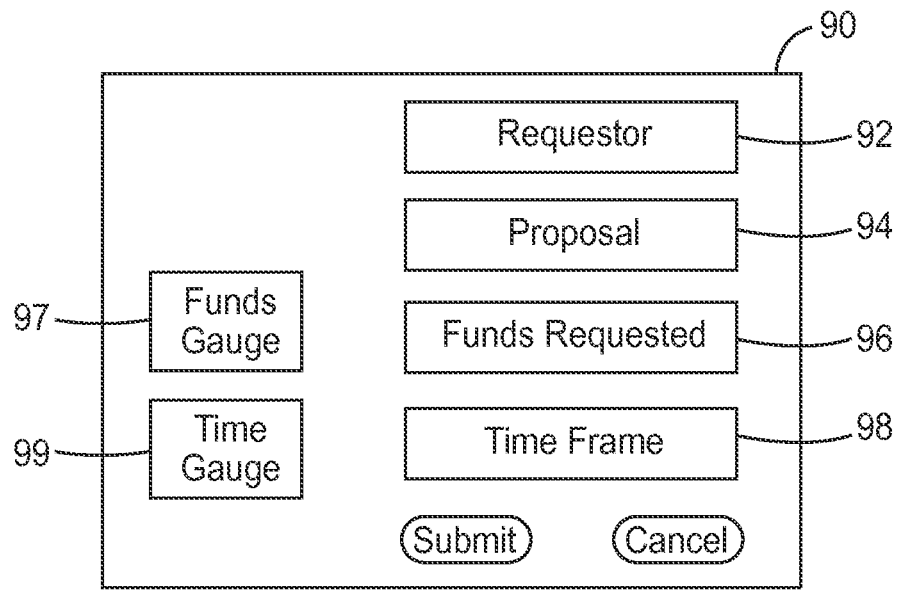
FIG. 4 is a diagram of a user interface for a requestor to submit a proposal.

FIG. 2 is a flow chart of a method 30 for receiving a proposal for crowd funding. Method 30 can be implemented in software for execution by a computer, such as one of the contributor computers or other computer coupled to entity computer systems 26 via network 24. In method 30, a requestor electronically submits a proposal for funds (step 32). FIG. 4 is a diagram of a user interface 90 for a requestor to submit a proposal. User interface 90 can be displayed on an electronic display device of a computer for the requestor to submit information. User interface 90 includes a section 92 to identify the requestor, a section 94 to describe the proposal or idea, a section 96 to identify the amount of funds requested, and a section 98 to indicate a time frame to generate the requested funds. The proposal in user interface 90 can be described in text, photos, video, or other multimedia content. User interface 90 can also include a funds gauge 97 and a time gauge 99 to provide a visual representation of the funds collected and time remaining to reach the funding goal. Gauges 97 and 99 can be implemented with icons in user interface 90. For example, funds gauge 97 can include a bar that increases in length as funds are collected, and time gauge 99 can include a clock that counts down showing the amount of time remaining. Gauges 97 and 99 can provide a way for both the requestor and potential contributors to view the status of the crowd funding for the proposal.

The entity records the proposal via entity computer systems 26 (step 34). The entity also determines whether to approve the proposal for crowd funding. Whether to approve the proposal can be determined by, for example, a committee with members who have voting rights to approve or deny proposals. If the proposal is denied, the entity can send a denial message such as via email to the requestor via network 24 from entity computer systems 26 (step 36). The proposal can be denied if, for example, all the syntax or information for the proposal is not complete, even though the idea itself would be approved. The review of the proposal to determine whether to approve or deny it would occur to determine if the proposal is complete and not to limit the idea, although in some embodiments the review can occur to approve or deny the actual idea proposed. If the proposal is approved, the entity broadcasts the proposal to potential contributors (step 38). The proposal can be broadcast as an email to eligible contributors for the project, or the proposal can be posted on an internal web site for the entity, and a message such as an email or text message can be sent to eligible contributors notifying them of the proposal.

Figure 3:
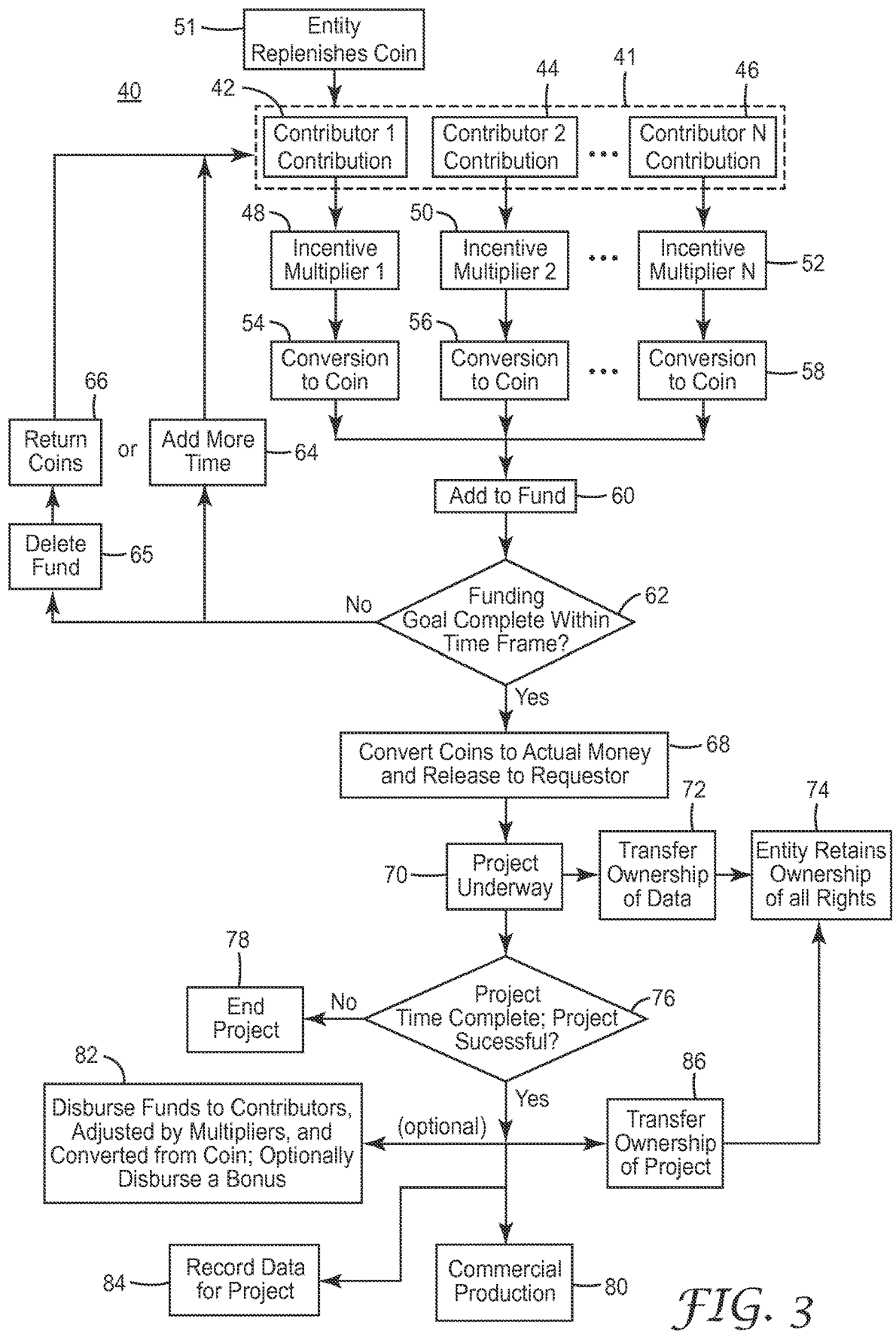
FIG. 3 is a flow chart of a method for incentivized crowd funding.
Figure 5:
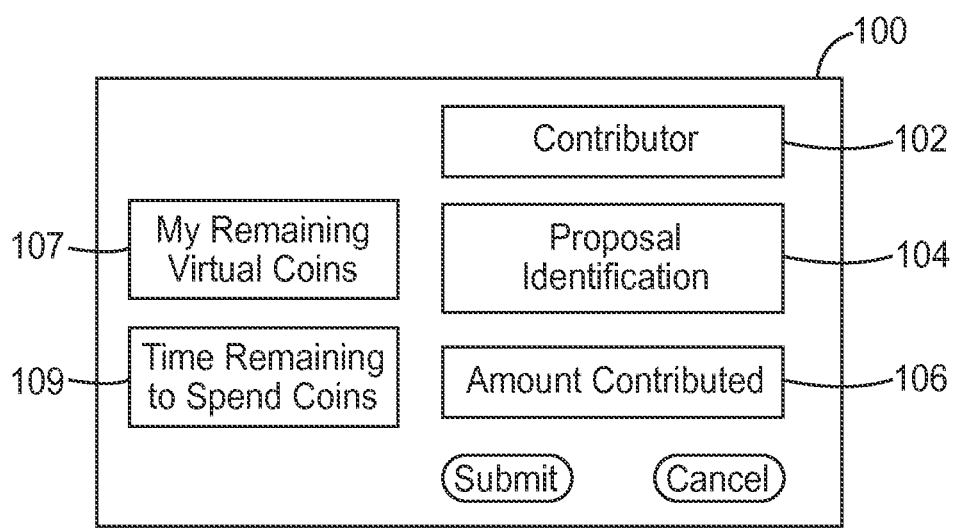
FIG. 5 is a diagram of a user interface for making a contribution to a proposal.

FIG. 3 is a flow chart of a method 40 for incentivized crowd funding. Method 40 can be implemented in software for execution by the contributor computers 10, 20, and 22, and entity computer systems 26. In method 40, the pool of potential contributors 41, as represented by contributions 42, 44, and 46, can view a proposal and make a contribution to fund it. Only three contributions are shown for illustrative purposes; the funding could come from a wide range of the number of contributors. FIG. 5 is a diagram of a user interface 100 for making a contribution to a proposal. User interface 100 can be displayed on an electronic display device of a computer for the contributor to make a contribution. User interface 100 includes a section 102 to identify the contributor, a section 104 to identify the proposal to which the contributor is making a contribution, and a section 106 to indicate the amount contributed to this proposal. The amount contributed can be billed to the contributor or assessed as a payroll deduction, for example. If the contributor is providing coin for the funding, then the amount of the contribution can be deducted from the contributor's coin account. User interface 100 can also include a section 107 to display an indication of the contributors remaining amount of coin, and a section 109 to display an indication of the time remaining for the contributor to spend the coin on proposals.

Each of the contributors' contributions 42, 44, and 46 can be selectively subject to corresponding incentive multipliers (steps 48, 50, and 52, respectively). Incentives are provided in part by multipliers that can increase the potential return based upon particular criteria such as the country where a contributor is based, the group or division to which a contributor is assigned, the number of successful projects to which the contributor has contributed, or other criteria to encourage participation by certain individuals or groups. As an example, the incentive multiplier can be 1.5 or 2.0 so that, if a project is successful, the corresponding contributor receives 1.5 times or twice the original contribution, respectively. Instead of using corporate or entity funds to make one large internal grant, the corporate funds can be used to encourage participation by offering a potential return based upon the incentive multipliers. When a proposal is broadcast, the entity can optionally include an identification of incentive multipliers for the project. For example, if the entity wants to encourage participation by employees of the entity based in Europe, the entity can indicate that any contributor based in Europe will receive an incentive multiplier along with an indication of such multiplier. As another example, if the entity wants to encourage participation by employees who work in the same group or division as the requestor, the entity can indicate that any of those employees as contributors will receive an incentive multiplier.

Also, to provide for raising many small amounts of money, the individual contributions, represented by contributions 42, 44, and 46, can be limited to a certain percentage of the fund goal (amount requested), for example 5% or 1%. For example, if the requested amount of funds is $10,000, the entity can limit individual contributions to 5% of that amount or $500. As another example, the entity can establish a monetary limit such as $100 for each contribution to a proposal. Other percentages or monetary limits are possible, if used. These limits can help to encourage participation by a large number of contributors as often desired for crowd funding. If an individual contribution exceeds the limit, when used, then the contribution is not accepted, and the corresponding contributor can possibly be notified that the attempted contribution exceeded the limit.

The contributions 42, 44, and 46, after selectively adjusted by the incentive multipliers, are converted to a corresponding amount of coin (steps 54, 56, and 58, respectively), and the resulting amounts are added to the fund in step 60. Coin can be used as artificial or virtual currency. In particular, coin is an artificial monetary amount representing an actual amount of money preferably in a single currency. Coin can also be branded to convey specific corporate messages or link the history of the organization (entity) to significant people or events in the life of the organization. Coin thus provides a way to convert contributions in a variety of currencies to a universal monetary unit, as well as communicate to requestors and contributors.

The existing currency exchange rates can be used to convert from a contributor's currency to coin, or artificial exchange rates can be generated for conversion to coin. The exchange rate used to convert to coin is saved to later potentially convert back to currency when funds are disbursed for successful projects. The type of currency for coin can be, for example, the currency of a requestor's country. For example, if the requestor is based in the United States, then the coin can represent US dollars for this requestor's fund, and the contributor's contributions, if not in US dollars, are converted from the currency of origin to US dollars. For example, if a contributor is based in Europe and the requestor is based in the United States, the contributor's contribution can be converted using the current exchange rate (at the time of the contribution) from euros to US dollars. The artificial exchange rates, if used, can be another way to provide incentives by establishing exchange rates between particular currencies greater than existing exchange rates.

Furthermore, instead of contributing actual money, it is possible for contributors to earn coin through particular activities such as presenting a technical paper, the contributors' number of granted patents, or the contributor's rating as determined by performance reviews. The earned coins can optionally have an expiration date, for example at the end of the current fiscal year for the entity.

Instead of, or in addition to, earning coin the entity can distribute coin to the pool of potential contributors 41 in step 51. In particular, the entity can replenish coins to the pool of contributors. This distributed coin, and possibly the earned coin, can be owned by the entity and licensed to the contributors with the license specifying how the coin can be used and a time limit on it. For example, the license can include the following terms: the coin can only be used to fund eligible requestors' proposals; the coin represents a value of actual money but has no monetary value itself; and the coin must be used within the current fiscal year of the entity, otherwise the coin expires.

Figure 6:
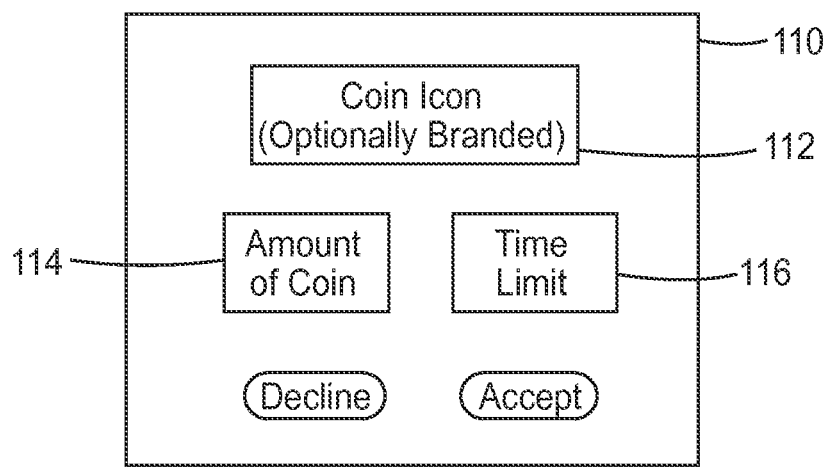
FIG. 6 is a diagram of a user interface for distributing coin to a pool of potential contributors.

FIG. 6 is a diagram of a user interface 110 for distributing coin to a pool of potential contributors. User interface 110 can be displayed on an electronic display device of a computer for potential contributors to receive the coin. User interface 110 includes a section 112 to display a coin icon representing coin, a section 114 to display the amount of coin (number of units) to be distributed, and a section 116 to display a time limit for using the distributed coin. If the coin is licensed to the potential contributor, the contributor can select the accept button on user interface 110 to accept the terms of the license and receive the coin into the contributors coin account subject to the license. The contributor could view the license terms in user interface 110 or another associated user interface. The value of the coins distributed can be based upon, for example, a particular proposal. As an example, if the requestor for a proposal is based in the United States, then one coin (one unit) can equal one US dollar. As another example, if the requestor for a proposal is based in Europe, then one coin (one unit) can equal one European Union euro.

Figure 7:
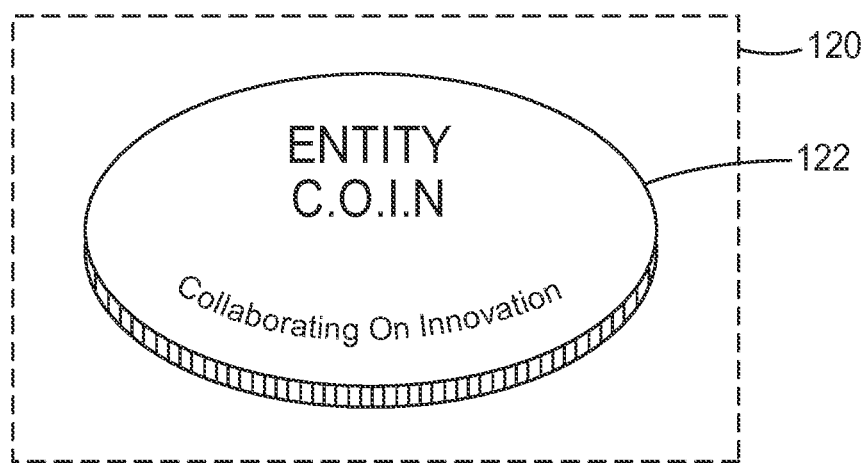
FIG. 7 is a diagram of an exemplary icon for a coin.

As indicated above, the coin can optionally be branded. FIG. 7 is a diagram of an exemplary icon 122 for coin to be displayed on an electronic display device or screen represented by dashed line 120, for example as the coin icon 112 in user interface 110. This exemplary icon 122 resembles a monetary coin and can include the entity name or brand, possibly stylized, along with a message as shown.

Entity computer systems 26 determine if the funding goal is complete within the specified time frame for contributions (step 62). If the funding goal is not complete, entity computer systems 26 can add more time for raising funds (step 64), or delete the fund (step 65) and return any coins to the contributors (step 66). Deleting the fund in step 65 means that the contributors are not charged with the amounts of actual money they had proposed contributing, and if the contributors originally used earned coin as the proposed contribution, those coins are returned to the contributors coin account in step 66. If more time is added to raise funds, the requestor can optionally refine the proposal and resubmit it.

If the funding goal is complete within the time frame (step 62), entity computer systems 26 convert the coins for the proposal to actual money and release the money to the requestor (step 68), and the project is underway (step 70). By using coin to represent an artificial monetary amount, actual money for the funds can optionally be locally released to the requestor in the country where the requestor is based. For example, if the entity is based in the United States but the requestor is based in Europe, the entity can instruct a European division of the entity to release the actual money to the requestor rather than transferring money from the United States to a European location or account. The actual money can be released by, for example, providing an electronic transfer of funds to the requestor's bank account or by issuing a check to the requestor. Furthermore, by using coin to represent an artificial monetary amount, the actual money for the project is only expensed when the project is approved, for example.

Upon beginning the project, the requestor transfers ownership of the data for the project to the entity (steps 72 and 74). Transferring ownership of the data can include transferring intellectual property rights in the data such as any applicable patent, copyright, trademark, and trade secret rights. As the project is underway, a status of the project can be provided to the contributors by, for example, an email message or electronic posting, allowing the contributors to track the progress of the projects to which they have contributed.

When the project time is complete, it is determined whether the project was successful (step 76). If the project was not successful, the project ends and no funds are returned to the contributors, having taken the risk of funding the project (step 78). If the project was successful, the project can possibly enter commercial production by the entity (step 80). A project can be deemed successful if, for example, the project can result in a commercial product for the entity, if the project results in a working prototype, or according to other criteria. Also, the requestor transfers ownership of the project to the entity (steps 86 and 74). Transferring ownership of the project can include transferring ownership of any resulting prototypes or other physical items and transferring intellectual property rights in the project such as any applicable patent, copyright, trademark, and trade secret rights.

Entity computer systems 26 record data for the project (step 84) and optionally disburse funds to the contributors, adjusted by the corresponding incentive multipliers, and converted from coin to the contributors' currencies using the corresponding conversion rates (step 82). When step 82 is executed, the funds or bonus can be disbursed by, for example, electronic transfers to the contributors' bank accounts or by issuing checks to the contributors. If the project was funded with coins distributed to the pool of potential contributors, then the entity may not execute step 82. If the project was funded in part by contributors money converted to coin, then the entity may elect to execute step 82 for those types of contributions. Alternatively for step 82, the contributors, or selected ones of the contributors, can receive a type of bonus, for example a monetary bonus or an increase in virtual coins to reinvest in other projects with the coins being deposited into the contributors' coin accounts. Another type of bonus can involve rewarding successful investors, meaning the contributors who have contributed to projects deemed successful. A contributor's number of successful projects can be tracked, and the contributors who contribute to such successful projects can be rewarded with additional or increasing amounts of virtual coin to reinvest in other projects. This bonus for contributing to successful projects can be, for example, a set amount of coin for each successful project or increasing amounts of coin based upon the number of successful projects. Therefore, those contributors who have a proven record of contributing to successful projects can be rewarded with more coin and encouraged to invest in more proposals they believe will result in successful projects.

Table 1 provides an example of a data structure for granting coin to contributors based upon particular activities. Table 2 provides an example of a data structure for recording conversion rates for converting contributions to a corresponding amount of coin. Table 3 provides an example of a data structure for recording data for contributions for a particular project. Table 4 provides an example of a data structure for recording coin distributed to potential contributors. Table 5 provides an example of a data structure for recording project data. Tables 1-5 are representative of data structures to be stored in a computer memory or electronic database for access by the entity computer systems or other computers.

TABLE 1

Earned Coin Amounts

| Activity | Amount of Coin |
|---|---|
| activity 1 | amount 1 |
| activity 2 | amount 2 |
| ... | |
| activity N | amount N |

TABLE 2

Conversion Rates

| Type of Currency | Rate for Conversion to Coin |
|---|---|
| Coin | 1 |
| currency 1 | current rate for currency 1 OR artificial rate 1 |
| currency 2 | current rate for currency 2 OR artificial rate 2 |
| ... | |
| currency N | current rate for currency N OR artificial rate N |

TABLE 3

Project Contributors

| Contributor | Country | Contribution | Incentive Multiplier | Conversion Rate |
|---|---|---|---|---|
| contributor ID 1 | country 1 | amount 1 | multiplier 1 | rate 1 |
| contributor ID 2 | country 2 | amount 2 | multiplier 2 | rate 2 |
| ... | | | | |
| contributor ID N | country N | amount N | multiplier N | rate N |

TABLE 4

Coin Distribution

| Pool of Potential Contributors | Amount (Number of Coins) | Expiration Date |
|---|---|---|
| contributor ID 1 | amount 1 | date 1 |
| contributor ID 2 | amount 2 | date 2 |
| ... | | |
| contributor ID N | amount N | date N |

TABLE 5

Project Data

| Project ID | Requestor | Amount of Coin Received | Product |
|---|---|---|---|
| project 1 | requestor 1 | fund 1 | product 1 |
| project 2 | requestor 2 | fund 2 | product 2 |
| ... | | | |
| project N | requestor N | fund N | product N |

The crowd funding method described above can be implemented, for example, as a software application integrated with existing entity computer systems. The entity controls the process in part by owning the proposal, the project, and coins for it. The entity also owns the intellectual property rights covering the proposal and the project, providing an incentive for the entity to commercialize successful projects. This crowd funding method thus provides a specific type of crowd funding that may be useful for organizations as a way to fund innovation and internally develop ideas, aside from the more commonplace ways organizations fund research and development.

The invention claimed is:

1. A computer-implemented method of crowd funding for innovation, comprising steps of:
   distributing via a computer system a proposal with a description of a project from a requestor, an amount of funds requested, and a time frame for raising the funds;
   setting by an entity first conversion rates based on types of currencies and setting by the entity second conversion rates based on a country where a contributor is based;
   receiving by the entity via the computer system contributions from contributors and for each of the contributions received,
      if a time limit on the contribution has not expired:
         converting the contribution to a corresponding amount of coin according to the first and second conversion rates, wherein the coin is an artificial monetary amount representing an actual amount of money; and
            adding the converted contribution to the funds; and
      if the time limit on the contribution has expired:
         not adding the contribution to the funds;
   providing the entity with ownership of the coin;
   sending to a pool of potential contributors particular amounts of the coin, wherein the sending step comprises:
      electronically displaying a user interface to distribute the particular amounts of coin; and
      displaying within the user interface an amount of coin and the time limit to spend the amount of coin;
   releasing via the computer system from the entity to the requestor an amount of money corresponding with the amount of coin in the funds and transferring ownership of the project to the entity, if the funds satisfy the amount of funds requested within the time frame;
   returning the contributions to the contributors or adding more time to the time frame, if the funds do not satisfy the amount of funds requested within the time frame; and
   determining whether or not the project is successful after the money is released.

2. The method of claim 1, wherein the receiving step further comprises selectively adjusting the contribution by an incentive multiplier, if the time limit on the contribution has not expired.

3. The method of claim 2, further comprising the step of distributing the funds by the entity to the contributors, adjusted by the corresponding incentive multipliers, and converted from the coin by the corresponding first and second conversion rates.

4. The method of claim 2, wherein the adjusting step comprises multiplying the contribution by a value greater than one and less than or equal to two as the incentive multiplier.

5. The method of claim 1, wherein the converting step comprises using one of the second conversion rates corresponding with a country of the contributor.

6. The method of claim 1, further comprising limiting each of the contributions to no more than a particular percentage of the amount of funds requested.

7. The method of claim 1, wherein the converting step comprises using a single type of currency for the coin.

8. The method of claim 1, wherein the transferring step includes transferring intellectual property rights in the project to the entity.

9. The method of claim 1 wherein the sending step further comprises licensing the particular amounts of the coin to the pool of potential contributors, wherein the license restricts usage of the coin to crowd funding of projects within the entity and specifies the time limit when the coin can be used for the crowd funding.

10. The method of claim 1, wherein the distributing step comprises electronically displaying a user interface identifying the proposal.

11. The method of claim 10, wherein the distributing step further comprises displaying within the user interface an indication of the funds received for the proposal and a time remaining in the time frame.

12. The method of claim 1, wherein the receiving step comprises electronically displaying a user interface to receive the contributions.

13. The method of claim 12, wherein the receiving step further comprises displaying within the user interface an amount of coin remaining for the contributor and a time remaining to spend the remaining coin.

14. The method of claim 1, further comprising the step of distributing by the entity to the contributors, or selected ones of the contributors, a bonus comprising a set amount of the coin.

15. The method of claim 2, wherein the incentive multiplier comprises a country where the contributors are based.

16. The method of claim 2, wherein the incentive multiplier comprises a number of successful projects to which the contributors have contributed.

17. The method of claim 2, wherein one of the second conversion rates is used for the incentive multiplier.

* * * * *